US012767359B2

(12) United States Patent
Knoebel et al.

(10) Patent No.: US 12,767,359 B2
(45) Date of Patent: Oct. 20, 2026

(54) DYNAMIC WARHEAD POINTING AND STABILIZATION INDEPENDENT FROM FLIGHT VECTOR

(71) Applicant: FLIR Unmanned Aerial Systems ULC, Vancouver (CA)

(72) Inventors: Nathan Knoebel, Orem, UT (US); Matthew Titensor, Orem, UT (US); Miguel Perez, Orem, UT (US)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 145 days.

(21) Appl. No.: 18/759,683

(22) Filed: Jun. 28, 2024

(65) Prior Publication Data

US 2026/0054862 A1 Feb. 26, 2026

Related U.S. Application Data

(60) Provisional application No. 63/511,606, filed on Jun. 30, 2023.

(51) Int. Cl.

| | |
|---|---|
| ***B64U 20/87*** | (2023.01) |
| ***F41G 9/00*** | (2006.01) |
| *B64U 10/14* | (2023.01) |
| *B64U 101/18* | (2023.01) |

(52) U.S. Cl.

CPC ............. *B64U 20/87* (2023.01); *F41G 9/002* (2013.01); *B64U 10/14* (2023.01); *B64U 2101/18* (2023.01)

(58) Field of Classification Search

CPC .... B64U 20/87; B64U 10/14; B64U 2101/18; F41G 9/002

USPC .............................................................. 701/3

See application file for complete search history.

(56) References Cited

U.S. PATENT DOCUMENTS

| | | | | |
|---|---|---|---|---|
| 2017/0075351 | A1* | 3/2017 | Liu | H04N 23/685 |
| 2019/0285388 | A1* | 9/2019 | Klar | F42B 30/00 |
| 2022/0404122 | A1* | 12/2022 | O'Sullivan | F41G 7/2286 |

FOREIGN PATENT DOCUMENTS

| | | | | |
|---|---|---|---|---|
| EP | 3722736 | A1 * | 10/2020 | F41H 11/02 |

* cited by examiner

*Primary Examiner* — Isaac G Smith
(74) *Attorney, Agent, or Firm* — Haynes and Boone, LLP

(57) ABSTRACT

Systems and methods include an unmanned aerial vehicle (UAV) having a body and a plurality of propulsion systems, a gimbal system having a plurality of targeting sensors and a warhead mount configured to carry and deploy a warhead, and a logic device. The logic device is configured to detect a target along a UAV flight path, track the target using sensed data from the targeting sensors, calculate an attack vector for the UAV to intercept the target, calculate a detonation angle for the warhead with respect to the attack vector and a selected location on the target, and instruct the gimbal system to orient the warhead at the detonation angle.

20 Claims, 13 Drawing Sheets

Example of off Axis Attack Engagement

Elevation Range of Motion

Azimuth Range of Motion

DYNAMIC WARHEAD POINTING AND STABILIZATION INDEPENDENT FROM FLIGHT VECTOR

CROSS REFERENCE TO RELATED APPLICATION

This application claims priority to and the benefit of U.S. Provisional Ser. No. 63/511,606 filed Jun. 30, 2023 and entitled "DYNAMIC WARHEAD POINTING AND STABILIZATION INDEPENDENT FROM FLIGHT VECTOR," which is incorporated herein by reference in its entirety.

TECHNICAL FIELD

The present disclosure relates generally to warhead delivery systems and methods and, more particularly for example, to systems and methods for delivering and deploying a warhead via an aerial delivery vehicle, such as an unmanned aerial vehicle or a missile.

BACKGROUND

Modern unmanned sensor platforms, such as unmanned aerial vehicles (UAVs), operate over long distances and in various environments (e.g., rural, urban, undeveloped). UAVs are used to support a wide range of real-world applications including surveillance, reconnaissance, exploration, item transportation, disaster relief, aerial photography, large-scale agriculture monitoring, and other untethered or tethered applications.

In military operations, a UAV (or other aerial delivery vehicle) may be used to deliver a warhead to a target (e.g., a military tank or other vehicle, a weapons cache, a communications site, or other target). The UAV may approach the target along an attack vector to a location on the target for effective deployment of the warhead (e.g., a vulnerable area of the target, a location likely to disable the target). The angle of the warhead's impact can also affect the strike's effectiveness. For example, an armor penetrating warhead may require a near orthogonal engagement angle with the target.

The warhead is typically mounted on a UAV at a fixed angle selected for effective deployment of the particular warhead on the desired target. During a mission, the UAV's flight system may attempt to fly the UAV to the target location while positioning the UAV (and the warhead mounted thereon) at the optimal deployment angle. In some situations, achieving these two objectives may be challenging, requiring the UAV to make aggressive maneuvers to reach the desired location relative to the target and the desired angle. In some scenarios, the UAV may be unable to achieve the proper location and angle due to factors such as a target movement, weather conditions (e.g., wind), obstacles (e.g., buildings), or other factors.

In view of the foregoing, there exists a need for improved systems and methods for delivering and deploying a warhead using an aerial delivery vehicle that address the deficiencies noted above, other deficiencies known in the industry, or at least offers an alternative to current techniques.

SUMMARY

The present disclosure describes systems and methods for dynamically pointing and stabilizing a warhead independent from a flight vector or orientation of an aerial vehicle.

In various embodiments, a system includes an unmanned aerial vehicle (UAV) comprising a body and a plurality of propulsion systems, a gimbal system comprising a plurality of targeting sensors and a warhead mount configured to carry and deploy a warhead, and a logic device. The logic device is configured to detect a target along a UAV flight path, track the target using sensed data from the targeting sensors, calculate an attack vector for the UAV to intercept the target, calculate a detonation angle for the warhead with respect to the attack vector and a selected location on the target, and instruct the gimbal system to orient the warhead at the detonation angle.

In various embodiments, a method includes detecting a target along an unmanned aerial vehicle (UAV) flight path, the UAV including a body, a plurality of propulsion systems, and a gimbal system comprising a plurality of targeting sensors and a warhead mount configured to carry and deploy a warhead, tracking the target using sensed data from at least one of the targeting sensors, calculating an attack vector for the UAV to intercept the target, calculating a detonation angle for the warhead with respect to the attack vector and a selected location on the target, and instructing the gimbal system to orient the warhead at the detonation angle.

In some embodiments, the gimbal system is mounted on a front side of the UAV when the UAV is aligned with the attack vector. In other embodiments, the gimbal system may be mounted at other locations of the UAV. The targeting sensors may include an optical imaging sensor, a thermal imaging sensor, a proximity sensor, and/or other sensor(s) configured to determine a proximity to the target.

The gimballed system may further include fuzing elements configured to detonate the warhead after the proximity sensor determines that the warhead is within a desired detonation range, a rotatable inner stage comprising the warhead mount and a sensor mount, and/or one or more motors configured to selectively rotate the targeting sensors and warhead mount along a first axis of rotation perpendicular to the warhead mount and a second axis of rotation perpendicular to the first axis of rotation. In some embodiments, the gimballed system may include more than two axes. In some embodiments, the gimballed system includes a single axis, for example, an axis of rotation perpendicular to the warhead mount or another axis of rotation.

In some embodiments, the warhead is continuously oriented at the detonation angle towards the target location independent of the flight path and vehicle orientation. The gimbal system may further include a payload navigation system configured to process sensor data from at least one payload navigation sensor, at least one UAV navigation sensor, and/or at least one target tracking sensor (e.g., optical imager, thermal imager, laser seeker, etc.) and calculate the detonation angle. The gimbal system may further include a 2-axis (or more) inertially and actively stabilized mount actuated by direct drive electrical motors and controlled by a custom inertial navigation system and gimbal controller.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1A:
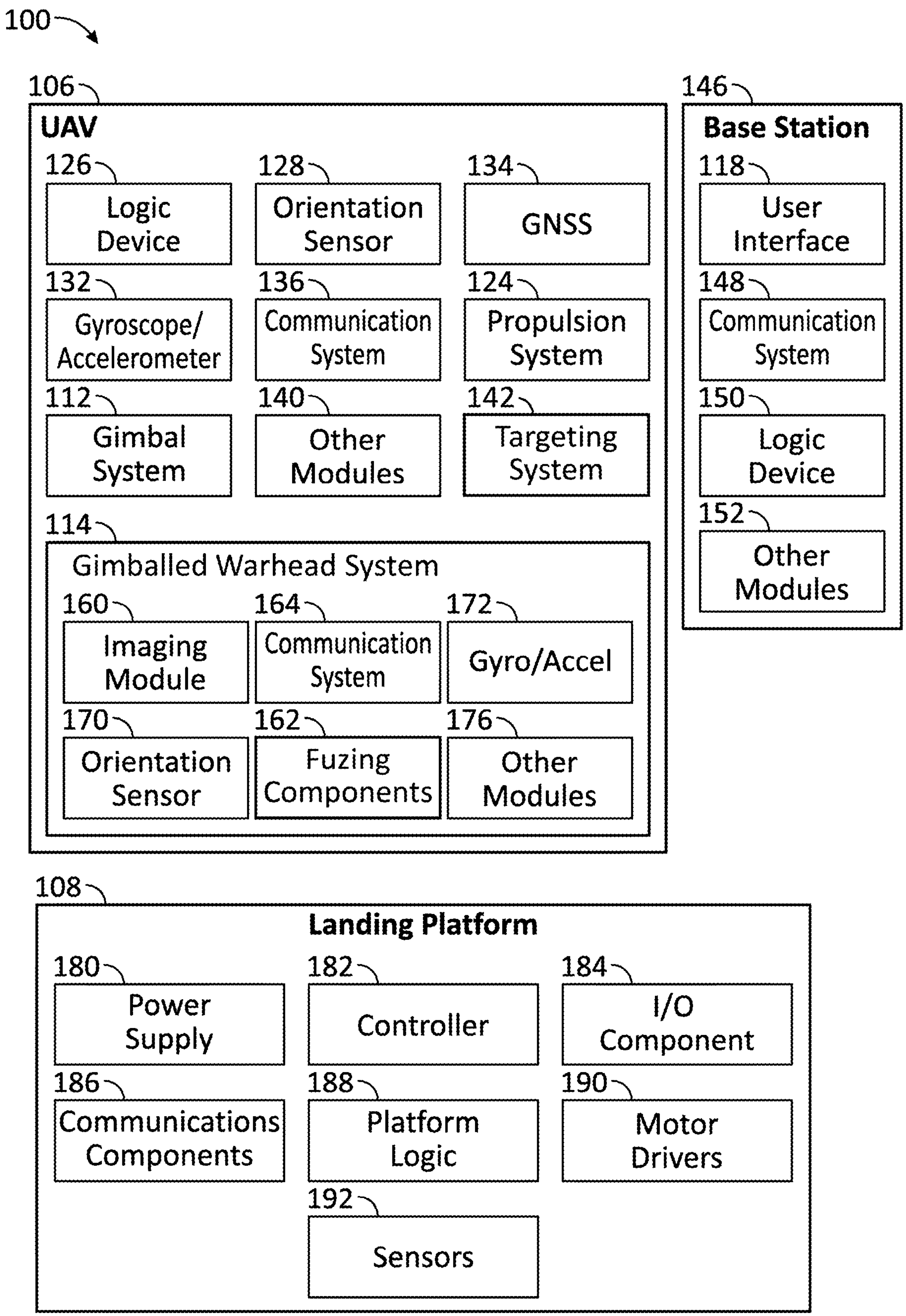
FIG. 1A illustrates a block diagram of a system, in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Unmanned aerial vehicles (UAVs), such as multi-rotor, electrically powered aircraft, are commonly used in military applications for the delivery of payloads (e.g., cameras, sensors, munitions, etc.), guidance, and surveillance and patrolling. In some implementations, the payload includes a warhead that is delivered to a target for deployment using a UAV or other aerial delivery vehicle. However, achieving precision targeting from an aerial platform such as a UAV or missile remains a significant challenge. Traditional warheads fixed into or on the aerial vehicle can limit the choice of target sets, points of aim, and attack angles. Moreover, the vehicle's motion can cause the warhead's point of aim to deviate, resulting in reduced accuracy and potentially increased collateral damage.

To successfully deploy a warhead on a target, it is desirable for the warhead to engage the target at a particular location on target body and at a particular angle. A warhead may be able to hit the desired location on the target, but if the angle is off, some warheads may not have the desired effects. An example is an armor penetrating warhead which may require a near orthogonal engagement angle with the target. For traditionally mounted warheads, the angle of attack is fixed to the delivery vehicle's vector, which may include a fixed offset built into the mounting. As such, the adjustment in attack angle and point of impact depends largely on the vehicle dynamics. In some situations, the aerial delivery vehicle may attempt to make aggressive or physically impossible maneuvers to position the fixed warhead appropriately for the target.

In accordance with various embodiments of the present disclosure, a warhead is mounted on an independently moving gimbal system of a UAV that decouples the warhead angle from the vehicle's approach angle and physical orientation. This solves many of the problems described above and additionally allows for more broad and dynamic delivery vehicle flight profiles. It further decouples the delivery vehicle's required closure rates as those are typically tied closely to vehicle approach angles due to aerodynamics. Slower moving delivery vehicles (such as a VTOL drone) can take advantage of hovering near or moving alongside targets allowing more precision or fidelity in where the warhead will be employed. The same equipped drone can employ a top-down, side, or even bottom-up attack across a broad range of closure rates without reconfiguration.

Traditional delivery vehicles face challenges in delivering smaller warheads with precision due to the close tie between vehicle approach angles and required closure rates due to aerodynamics. Larger platforms overcome these challenges by overmatching the target with significantly larger warheads than required. Smaller UAVs, however, require a smaller warhead and more precise targeting to maximize the effects. The present disclosure addresses these challenges by decoupling the warhead pointing from the delivery vehicle approach angles through an independently moving gimbal system. This results in decreasing the size, weight, power and cost of the system, while reducing collateral damage of deployment.

The gimballed warhead system facilitates independent control and stabilization of the point of aim, regardless of the motion of the carrying vehicle. The system may include a gimbal mechanism that supports imaging, targeting, and fuzing elements, enabling the warhead to remain boresighted with the munition point of aim. In some embodiments, the gimbal mechanism can rotate about two orthogonal axes to compensate for the motion of the carrying vehicle and maintain the point of aim.

FIG. 1A illustrates a block diagram of a system 100 including a UAV 106 and a landing platform 108 in accordance with one or more embodiments of the present disclosure. In various embodiments, UAV 106 may be configured to fly over a scene or survey area, to fly through a structure, or to approach a target and image or sense the scene, structure, or target, or portions thereof, such using a gimbal system 112 to aim a sensor payload 114 at the scene, structure, or target, or portions thereof, for example. Resulting imagery and/or other sensor data may be processed by the system and/or displayed to a user through use of a user interface 118 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of UAV 106 and/or sensor payload 114, such as controlling the gimbal system 112 to aim sensor payload 114 towards a particular direction, and/or controlling a propulsion system 124 to move UAV 106 to a desired position in a scene or structure or relative to a target. In some cases, the imagery and/or sensor data may be used to land UAV 106 at a target location or align UAV 106 to interact with the target location, which may be on landing platform 108.

UAV 106 may be implemented as a mobile platform configured to move or fly and position and/or aim the sensor payload 114 (e.g., relative to a designated or detected target). As shown in FIG. 1A, UAV 106 may include one or more of a logic device 126, an orientation sensor 128, a gyroscope/accelerometer 132, a global navigation satellite system (GNSS) 134, a communication system 136, gimbal system 112, propulsion system 124, and other modules 140. Operation of UAV 106 may be substantially autonomous and/or partially or completely controlled by a base station 146, which may include one or more of the following: user interface 118, a communications module 148, a logic device 150, and other modules 152. In other embodiments, UAV 106 may include one or more of the elements of base station 146, such as with various types of manned aircraft, terrestrial vehicles, and/or surface or subsurface watercraft. The sensor payload 114 may be physically coupled to UAV 106 and be configured to capture sensor data (e.g., visible spectrum images, infrared images, narrow aperture radar data, and/or other sensor data) of a target position, area, and/or object(s) as selected and/or framed by operation of UAV 106 and/or base station 146. In some embodiments, one or more of the elements of system 100 may be implemented in a combined housing or structure that can be coupled to or within UAV 106, a vehicle, and/or held or carried by a user of system 100.

Logic device 126 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 106 and/or other elements of system 100, such as the targeting system 142, for example. Such software instructions may also implement methods for processing infrared images and/or other sensor signals, determining sensor information, providing user feedback (e.g., through the user interface 118), querying devices for operational parameters, selecting operational parameters for devices, or performing any of the various operations described herein (e.g., operations performed by logic devices of various elements of system 100).

In addition, a non-transitory medium may be provided for storing machine readable instructions for loading into and execution by logic device 126. In these and other embodiments, logic device 126 may be implemented with other components where appropriate, such as volatile memory, non-volatile memory, one or more interfaces, and/or various analog and/or digital components for interfacing with devices of system 100. For example, logic device 126 may be adapted to store sensor signals, sensor information, parameters for coordinate frame transformations, calibration parameters, sets of calibration points, and/or other operational parameters, over time, for example, and provide such stored data to a user using the user interface 118. In some embodiments, logic device 126 may be integrated with one or more other elements of UAV 106, for example, or distributed as multiple logic devices within UAV 106, base station 146, and/or sensor payload 114.

In some embodiments, logic device 126 may be configured to substantially continuously monitor and/or store the status of and/or sensor data provided by one or more elements of UAV 106, sensor payload 114, targeting system 142, and/or base station 146, such as the position and/or orientation of UAV 106, sensor payload 114, and/or base station 146, for example. In various embodiments, sensor data may be monitored and/or stored by logic device 126 and/or processed or transmitted between elements of system 100 substantially continuously throughout operation of system 100, where such data includes various types of sensor data (e.g., for blinking pattern detection), control parameters, and/or other data.

The orientation sensor 128 may be implemented as one or more of a compass, float, accelerometer, and/or other device capable of measuring an orientation of UAV 106 (e.g., magnitude and direction of roll, pitch, and/or yaw, relative to one or more reference orientations such as gravity and/or Magnetic North), gimbal system 112, sensor payload 114, and/or other elements of system 100, and providing such measurements as sensor signals and/or data that may be communicated to various devices of system 100. In some cases, a yaw and/or position of UAV 106 may be adjusted to better position/orient UAV 106 to align with a target location based on a fiduciary marker associated with the target location. The gyroscope/accelerometer 132 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of UAV 106 and/or other elements of system 100 and providing such measurements as sensor signals and/or data that may be communicated to other devices of system 100 (e.g., user interface 118, logic device 126, logic device 150). The GNSS 134 may be implemented according to any global navigation satellite system, including a GPS, GLONASS, and/or Galileo based receiver and/or other device capable of determining absolute and/or relative position of UAV 106 (e.g., or an element of UAV 106) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, the GNSS 134 may include an altimeter, for example, or may be used to provide an absolute altitude.

The communication system 136 may be implemented as any wired and/or wireless communications module configured to transmit and receive analog and/or digital signals between elements of system 100. For example, the communication system 136 may be configured to receive flight control signals and/or data from base station 146 and provide them to logic device 126 and/or propulsion system 124. In other embodiments, the communication system 136 may be configured to receive images and/or other sensor information (e.g., visible spectrum and/or infrared still images or video images) from the sensor payload 114 and relay the sensor data to logic device 126 and/or base station 146. In some embodiments, the communication system 136 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by the communication system 136 may be configured to transmit data between elements of system 100 substantially continuously throughout operation of system 100, where such data includes various types of sensor data, control parameters, and/or other data.

The gimbal system 112 may be implemented as an actuated gimbal mount, for example, which may be controlled by logic device 126 to stabilize the sensor payload 114 relative to a target (e.g., a target location) or to aim the sensor payload 114 or components coupled thereto according to a desired direction and/or relative orientation or position. As such, the gimbal system 112 may be configured to provide a relative orientation of the sensor payload 114 (e.g., relative to an orientation of UAV 106) to logic device 126 and/or communication system 136 (e.g., gimbal system 112 may include its own orientation sensor 128). In other embodiments, the gimbal system 112 may be implemented as a gravity driven mount (e.g., non-actuated). In various embodiments, the gimbal system 112 may be configured to provide power, support wired communications, and/or otherwise facilitate operation of the sensor/sensor payload 114. In further embodiments, the gimbal system 112 may be configured to couple to a laser pointer, range finder, and/or other device, for example, to support, stabilize, power, and/or aim multiple devices (e.g., the sensor payload 114 and one or more other devices) substantially simultaneously.

In some embodiments, the gimbal system 112 may be adapted to rotate the sensor payload 114±90 degrees, or up to 360 degrees, in a vertical plane relative to an orientation and/or position of UAV 106. In further embodiments, the gimbal system 112 may rotate the sensor payload 114 to be parallel to a longitudinal axis or a lateral axis of UAV 106 as UAV 106 yaws, which may provide 360 degree ranging and/or imaging in a horizontal plane relative to UAV 106. In some embodiments, the gimbal system 112 may rotate the sensor payload 114 along a single axis (e.g., parallel to a longitudinal axis or a lateral axis of the UAV 106). In various embodiments, logic device 126 may be configured to monitor an orientation of gimbal system 112 and/or sensor payload 114 relative to UAV 106, for example, or an absolute or relative orientation of an element of sensor payload 114. Such orientation data may be transmitted to other elements of system 100 for monitoring, storage, or further processing, as described herein.

The propulsion system 124 may be implemented as one or more propellers, rotors, turbines, or other thrust-based propulsion systems, and/or other types of propulsion systems that can be used to provide motive force and/or lift to UAV 106 and/or to steer UAV 106. In some embodiments, the propulsion system 124 may include multiple propellers (e.g., a tri, quad, hex, oct, or other type "copter") that can be controlled (e.g., by logic device 126 and/or the logic device 150) to provide lift and motion for UAV 106 and to provide an orientation for UAV 106. In other embodiments, the propulsion system 124 may be configured primarily to provide thrust while other structures of UAV 106 provide lift, such as in a fixed wing embodiment (e.g., where wings provide the lift) and/or an aerostat embodiment (e.g., balloons, airships, hybrid aerostats). In various embodiments, the propulsion system 124 may be implemented with a portable power supply, such as a battery and/or a combustion engine/generator and fuel supply. In some embodiments, the propulsion system 124 further includes one or more sensors and/or encoders adapted to generate signals indicative of the azimuthal position of one or more blades. In various embodiments, logic device 126 may be configured to receive the signals and monitor the blade positions, rate of rotation (e.g., revolutions per minute), and/or other propulsion data. Such propulsion data may be used by other elements of system 100, such as the targeting system 142.

Other modules 140 may include other and/or additional sensors, actuators, communications modules/nodes, and/or user interface devices, for example, and may be used to provide additional environmental information related to operation of UAV 106, for example. In some embodiments, other modules 140 may include a humidity sensor, a wind and/or water temperature sensor, a barometer, an altimeter, a radar system, a proximity sensor, an audio sensor, a visible spectrum camera or infrared camera (with an additional mount), an irradiance detector, and/or other environmental sensors providing measurements and/or other sensor signals that can be displayed to a user and/or used by other devices of system 100 (e.g., logic device 126) to provide operational control of UAV 106 and/or system 100.

In some embodiments, other modules 140 may include one or more actuated and/or articulated devices (e.g., light emitting devices such as light emitting diodes (LEDs), multi-spectrum active illuminators, visible and/or IR cameras, radars, sonars, and/or other actuated devices) coupled to UAV 106, where each actuated device includes one or more actuators adapted to adjust an orientation of the device, relative to UAV 106, in response to one or more control signals (e.g., provided by logic device 126). In particular, other modules 140 may include a stereo vision system configured to provide image data that may be used to calculate or estimate a position of UAV 106, for example, or to calculate or estimate a relative position of a navigational hazard in proximity to UAV 106. In various embodiments, logic device 126 may be configured to use such proximity and/or position information to help safely pilot UAV 106 and/or monitor communication link quality, as described herein.

The user interface 118 of base station 146 may be implemented as one or more of a display, a touch screen, a keyboard, a mouse, a joystick, a knob, a steering wheel, a yoke, and/or any other device capable of accepting user input and/or providing feedback to a user. In various embodiments, the user interface 118 may be adapted to provide user input (e.g., as a type of signal and/or sensor information transmitted by the communication system 148 of base station 146) to other devices of system 100, such as the logic device 126. The user interface 118 may also be implemented with logic device 150 (e.g., similar to logic device 126), which may be adapted to store and/or execute instructions, such as software instructions, implementing any of the various processes and/or methods described herein. For example, the user interface 118 may be adapted to form communication links and transmit and/or receive communications (e.g., infrared images and/or other sensor signals, control signals, sensor information, user input, and/ or other information), for example, or to perform various other processes and/or methods described herein (e.g., via logic device 150).

In one embodiment, the user interface 118 may be adapted to display a time series of various sensor information and/or other parameters as part of or overlaid on a graph or map, which may be referenced to a position and/or orientation of UAV 106 and/or other elements of system 100. For example, the user interface 118 may be adapted to display a time series of positions, headings, and/or orientations of UAV 106 and/or other elements of system 100 overlaid on a geographical map, which may include one or more graphs indicating a corresponding time series of actuator control signals, sensor information, and/or other sensor and/or control signals.

In some embodiments, the user interface 118 may be adapted to accept user input including a user-defined target heading, waypoint, route, and/or orientation for an element of system 100, for example, and to generate control signals to cause UAV 106 to move according to the target heading, route, and/or orientation, or to aim the sensor payload 114 accordingly. In other embodiments, the user interface 118 may be adapted to accept user input modifying a control loop parameter of logic device 126, for example. In further embodiments, the user interface 118 may be adapted to accept user input including a user-defined target attitude, orientation, and/or position for an actuated or articulated device (e.g., the sensor payload 114) associated with UAV 106, for example, and to generate control signals for adjusting an orientation and/or position of the actuated device according to the target altitude, orientation, and/or position. Such control signals may be transmitted to logic device 126 (e.g., using the communication system 148 and 136), which may then control UAV 106 accordingly.

The communication system 148 may be implemented as any wired and/or wireless communications module configured to transmit and receive analog and/or digital signals between elements of system 100. For example, the communication system 148 may be configured to transmit flight control signals from the user interface 118 to communication system 136 or 164. In other embodiments, the communication system 148 may be configured to receive sensor data (e.g., visible spectrum and/or infrared still images or video images, or other sensor data) from the sensor payload 114. In some embodiments, the communication system 148 may be configured to support spread spectrum transmissions, for example, and/or multiple simultaneous communications channels between elements of system 100. In various embodiments, the communication system 148 may be configured to monitor the status of a communication link established between base station 146, the sensor payload 114, and/or UAV 106 (e.g., including packet loss of transmitted and received data between elements of system 100, such as with digital communication links), as described herein. Such status information may be provided to the user interface 118, for example, or transmitted to other elements of system 100 for monitoring, storage, or further processing.

Other modules 152 of base station 146 may include other and/or additional sensors, actuators, communications modules/nodes, and/or user interface devices used to provide additional environmental information associated with base station 146, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., logic device 126) to provide operational control of UAV 106 and/or system 100 or to process sensor data to compensate for environmental conditions, such as an water content in the atmosphere approximately at the same altitude and/or within the same area as UAV 106 and/or base station 146, for example. In some embodiments, other modules 152 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by the user interface 118).

In embodiments where the sensor payload 114 includes an imaging device, the sensor payload 114 may include an imaging module 160, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, the imaging module 160 may include one or more logic devices (e.g., similar to logic device 126) that can be configured to process imagery captured by detector elements of the imaging module 160 before providing the imagery to a memory or a communication system 164. More generally, the imaging module 160 may be configured to perform any of the operations or methods described herein, at least in part, or in combination with logic device 126 and/or user interface 118.

In some embodiments, the sensor payload 114 may be implemented with a second or additional imaging modules similar to the imaging module 160, for example, which may include detector elements configured to detect other electromagnetic spectrums, such as visible light, ultraviolet, and/or other electromagnetic spectrums or subsets of such spectrums. In various embodiments, such additional imaging modules may be calibrated or registered to the imaging module 160 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

The communication system 164 of the sensor payload 114 may be implemented as any wired and/or wireless communications module configured to transmit and receive analog and/or digital signals between elements of system 100. For example, the communication system 164 may be configured to transmit infrared images from the imaging module 160 to communication system 136 or 148. In other embodiments, the communication system 164 may be configured to receive control signals (e.g., control signals directing capture, focus, selective filtering, and/or other operation of sensor payload 114) from logic device 126 and/or user interface 118. In some embodiments, communication system 164 may be configured to support spread spectrum transmissions, for example, and/or multiple simultaneous communications channels between elements of system 100. In various embodiments, the communication system 164 may be configured to monitor and communicate the status of an orientation of the sensor payload 114 as described herein. Such status information may be provided or transmitted to other elements of system 100 for monitoring, storage, or further processing.

An orientation sensor 170 of the sensor payload 114 may be implemented similar to the orientation sensor 128 or gyroscope/accelerometer 132, and/or any other device capable of measuring an orientation of the sensor payload 114, the imaging module 160, and/or other elements of the sensor payload 114 (e.g., magnitude and direction of roll, pitch, and/or yaw, relative to one or more reference orientations such as gravity, Magnetic North, and/or an orientation of UAV 106) and providing such measurements as sensor signals that may be communicated to various devices of system 100. A gyroscope/accelerometer (e.g., angular motion sensor) 172 of the sensor payload 114 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of the sensor payload 114 and/or various elements of the sensor payload 114 and providing such measurements as sensor signals that may be communicated to various devices of system 100. Fuzing elements 162 may include proximity sensors, contact sensors, or any other suitable means for detonating a warhead, as described further herein.

Other modules 176 of the sensor payload 114 may include other and/or additional sensors, actuators, communications modules/nodes, cooled or uncooled optical filters, and/or user interface devices used to provide additional environmental information associated with the sensor payload 114, for example.

In some embodiments, other modules 176 may include a memory implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. The memory may also be implemented, at least in part, as removable memory, such as a secure digital memory card for example including an interface for such memory.

In some embodiments, other modules 176 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by the imaging module 160 or other devices of system 100 (e.g., logic device 126) to provide operational control of UAV 106 and/or system 100 or to process imagery to compensate for environmental conditions.

With continued reference to FIG. 1A, landing platform 108 may include various components to facilitate the operation of landing platform 108, including communications (e.g., with UAV 106 and/or base station 146, etc.), controlling various components and tests, and receiving and processing sensor data. In embodiments, landing platform 108 includes a power supply 180, a controller 182, an input/output (I/O) component 184, communications components 186, platform logic 188, one or more motor drivers 190, and one or more sensors 192, or any combination thereof.

Power supply 180 may be any power supply suitable to power landing platform 108 or components thereof. For instance, power supply 180 may include one or more batteries or other power supply components. In embodiments, landing platform 108 may be plugged into a power outlet or hardwired to a facility's electrical system or to a vehicle's electrical system to charge the batteries and/or power landing platform 108.

Controller 182 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of landing platform 108.

I/O component 184 may process user action, such as selecting keys from a keypad/keyboard and/or selecting one or more buttons, images, or links, such as for inputting or accessing/requesting data, and sends a corresponding signal to controller 182. I/O component 184 may also include an output component, such as a display control and a cursor control (such as a keyboard, keypad, mouse, etc.). I/O component 184 may include an optional audio/visual component to allow a user to use voice for inputting information by converting audio signals and/or input or record images/videos by capturing visual data. I/O component 184 may allow the user to hear audio and view images/video.

Communications components 186 may include wired and/or wireless interfaces. Wired interfaces may include communications links with various platform components and may be implemented as one or more physical networks or device connect interfaces (e.g., Ethernet, and/or other protocols). Wireless interfaces may be implemented as one or more Wi-Fi, Bluetooth, cellular, infrared, radio, and/or other types of network interfaces for wireless communications and may facilitate communications with wireless devices of landing platform 108, UAV 106, base station 146, and/or other component or system.

Platform logic 188 may be implemented as circuitry and/or a machine-readable medium storing various machine-readable instructions and data. For example, in some embodiments, platform logic 188 may store an operating system and one or more applications as machine readable instructions that may be read and executed by controller 182 to perform various operations described herein. In some embodiments, platform logic 188 may be implemented as non-volatile memory (e.g., flash memory, hard drive, solid state drive, or other non-transitory machine-readable mediums), volatile memory, or combinations thereof. Platform logic 188 may include status, configuration and control features which may include various control features disclosed herein. In some embodiments, platform logic 188 executes one or more tests or calibrations to be performed on landing platform 108, as described above. Status information of the tests, calibration specific values, and other information may be displayed to the user during production.

The one or more motor drivers 190 may control one or more motors of landing platform 108, such as an actuator or motor to control movement of various components of landing platform 108, as described herein. The one or more sensors 192 may include sensors for detecting calibration values, platform position, etc.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for UAV 106, using one or more power leads. Such power leads may also be used to support one or more communication techniques between elements of system 100.

Figure 1B:
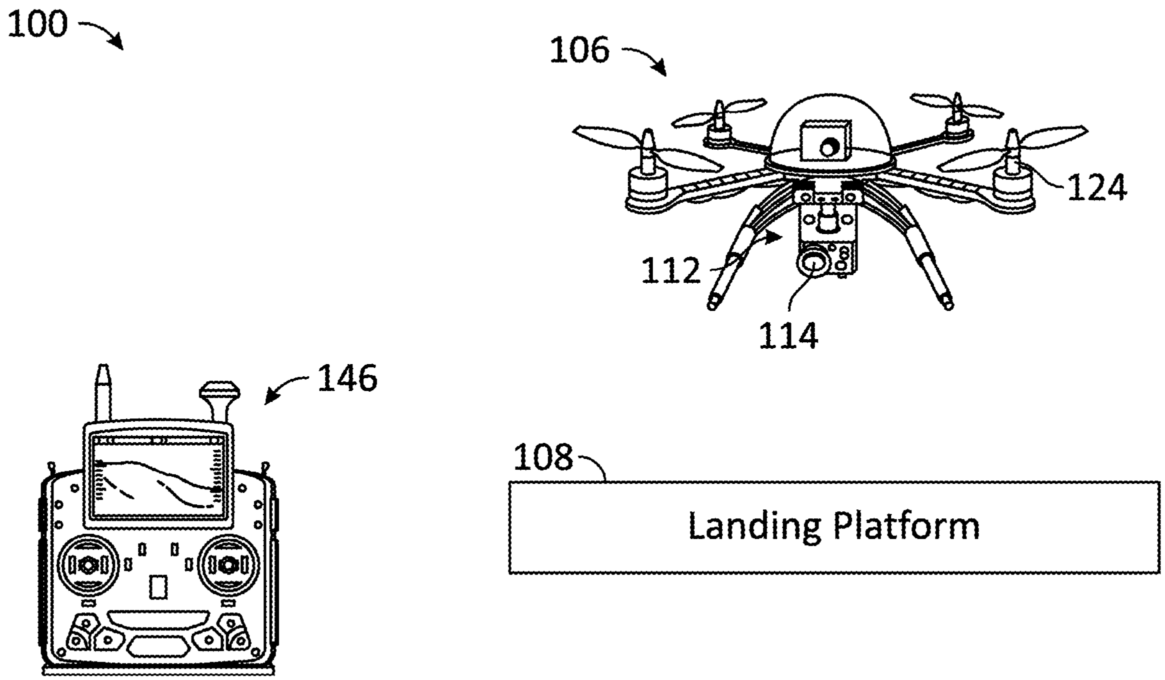
FIG. 1B illustrates an example implementation of the system of FIG. 1A, in accordance with one or more embodiments of the present disclosure.

FIG. 1B illustrates a diagram of system 100 in accordance with one or more embodiments of the present disclosure. In some embodiments, base station 146 may be configured to control motion, position, and/or orientation of UAV 106 and/or sensor payloads 114. Further, base station 146 may be configured to control operation of landing platform 108 in some embodiments. In various embodiments, UAV 106 may be configured to control an operation of landing platform 108 such that UAV 106 may automate a landing procedure as discussed herein. Generally, system 100 may include any number of UAVs, landing platforms, and base stations.

Figure 2:
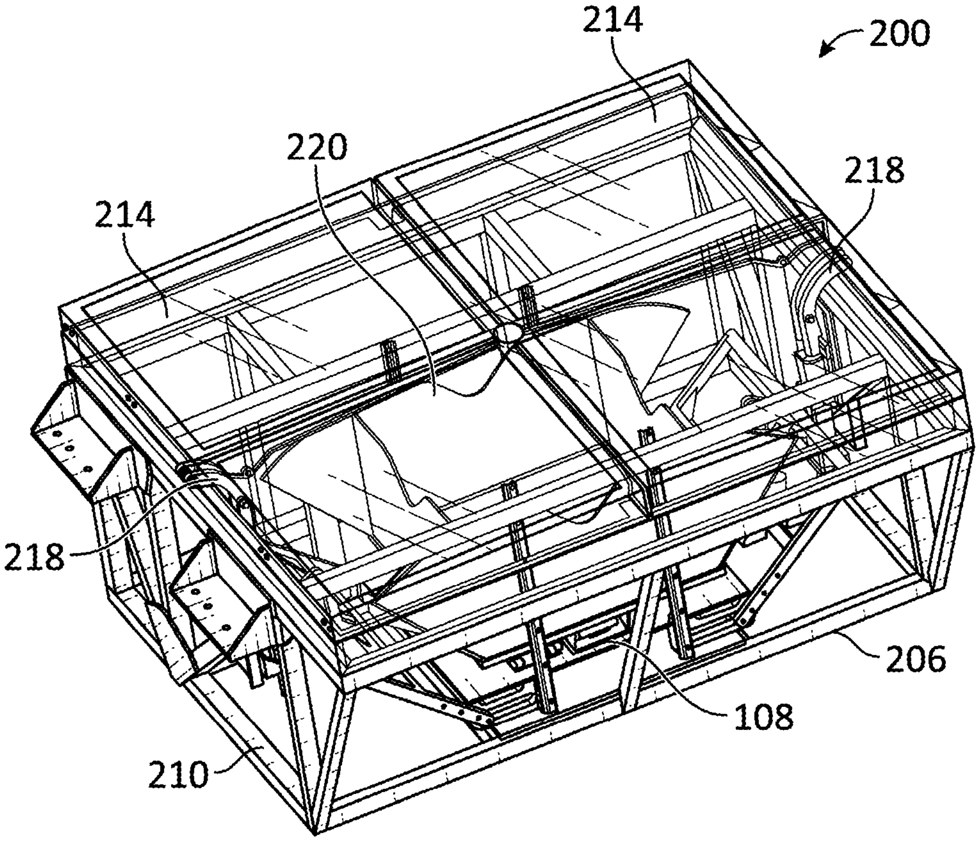
FIG. 2 illustrates a landing platform in a closed configuration, with portions of the platform shown transparent for illustration purposes, in accordance with one or more embodiments of the present disclosure.
Figure 3:
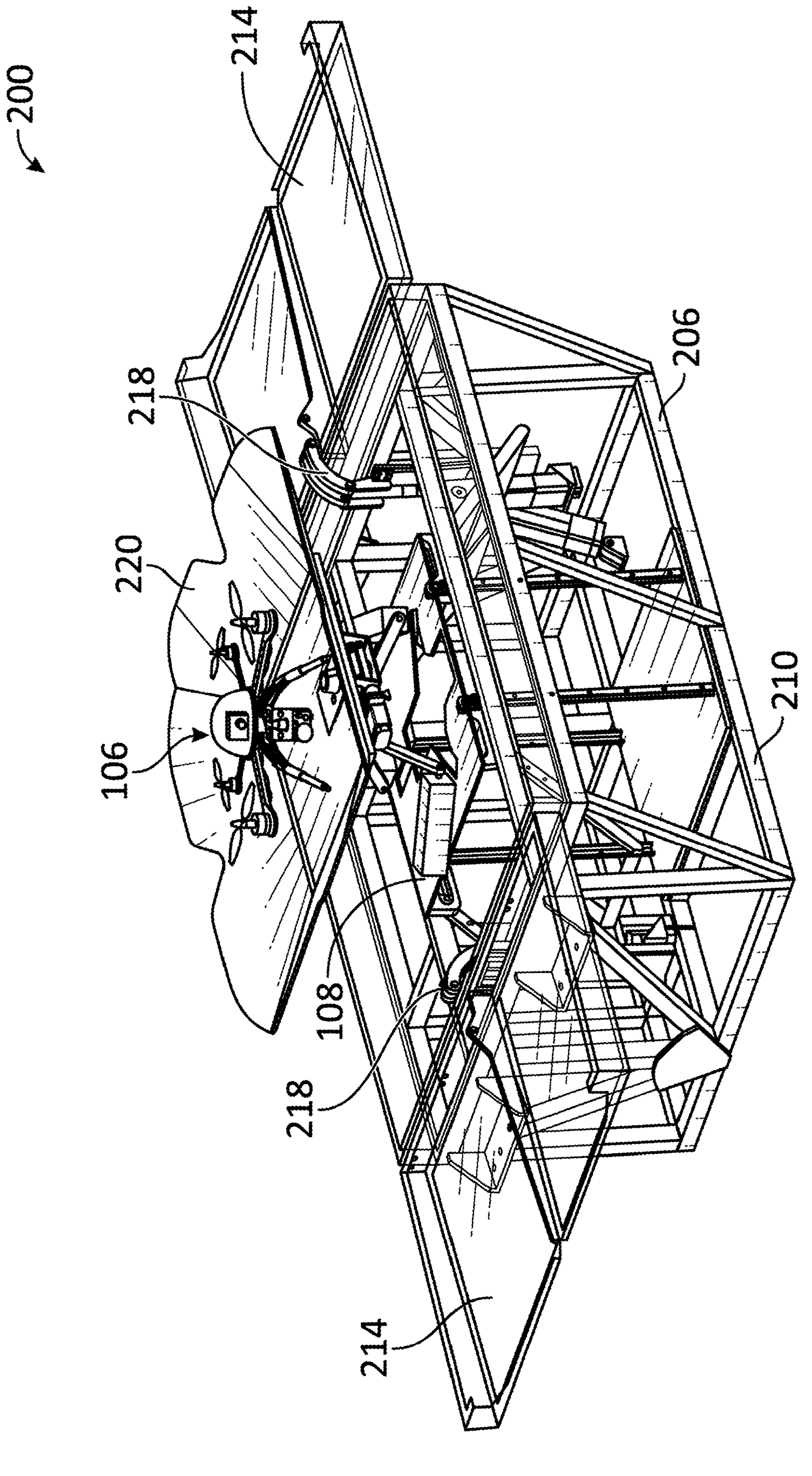
FIG. 3 illustrates the landing platform in an open configuration, with portions of the platform shown transparent for illustration purposes, in accordance with one or more embodiments of the present disclosure.

FIG. 2 illustrates a UAV landing/launch system 200 in a closed configuration, with portions of system 200 shown transparent for illustration purposes, in accordance with one or more embodiments of the present disclosure. FIG. 3 illustrates system 200 in an open configuration, with portions of system 200 shown transparent for illustration purposes, in accordance with one or more embodiments of the present disclosure. Referring to FIGS. 2-3, UAV 106 may be raised and lowered out of a container 206, the container 206 adapted to store UAV 106 between missions and/or protect UAV 106 from the environment. For example, landing platform 108 may be secured within container 206. As detailed more fully below, at least a portion of landing platform 108 may be raisable from container 206 to a launch position via a lift mechanism. The system 200 may allow landing platform 108 to be manipulated at any angle to keep landing platform 108 at a desired orientation, such as at an orientation required for UAV 106 to launch/land. Such embodiments may compensate for off-angle orientations of container 206, such as in embodiments where container 206 is mounted to a vehicle.

As illustrated in FIGS. 2-3, container 206 may include a frame 210 and one or more doors 214. For illustration purposes, doors 214 are illustrated transparent to illustrate other features of system 200. Frame 210 may provide a support structure to mount landing platform 108 within container 206 and/or mount container 206 (e.g., to a vehicle). As illustrated in FIG. 2, the one or more doors 214 may be closed to, for example, secure landing platform 108 in container 206 and/or protect landing platform 108 from the environment. As illustrated in FIGS. 2-3, the one or more doors 214 may be opened to, for example, allow raising of landing platform 108 to a launch position. In embodiments, raising landing platform 108 may cause door(s) 214 to automatically open, such as via an arm 218 securing door(s) 214 to landing platform 108. Lowering landing platform 108 into container 206 may cause door(s) 214 to automatically close, such as via arm 218.

Referring to FIG. 2, landing platform 108 may be configurable to allow platform storage of landing platform 108 within container 206. For example, landing platform 108 may include one or more folding sections or elements 220 allowing landing platform 108 to fold up into a smaller size to be stowed in container 206. Referring to FIG. 3, the folding elements 220 may be unfolded when landing platform 108 is raised from container 206, such as to provide a larger landing platform for UAV 106. In embodiments, folding elements 220 may be adapted to position UAV 106 on landing platform 108. For example, at least a portion of folding elements 220, when in a closed position, may be adapted to trap on a feature of UAV 106 to hold UAV 106 in place.

Folding elements 220 are illustrative only, and any reference to folding or unfolding is for convenience only and should not be construed as a required feature unless otherwise claimed. For example, landing platform 108 may include other configurations, including articulating or moving elements that selectively collapse or close to engage UAV 106 and/or fit landing platform 108 within container 206, and selectively expand or open to facilitate UAV take-off and/or landing. For instance, and without limitation, landing platform 108 may include an articulating stage without any folding features.

Referring to FIGS. 4A-D, an example gimballed warhead system will now be described in accordance with one or more embodiments. A UAV 400 (such as UAV 106 illustrated in FIGS. 1A-B) is configured with a gimbal system 412 to aim a payload 414 at a target. The payload includes a warhead and one or more targeting sensors. In the illustrated embodiment, the gimbal system 412 is mounted to the front of the UAV 400, and is configured to control the attack angle of the payload 414 with respect to the UAV 400 and the target. The gimbal system 412 is configured to provide improved deployment efficiency over conventional fixed mounted systems by facilitating improved control and stabilization of the attack angle of the warhead independent of attack vector of the carrying vehicle.

In various embodiments, UAV 400 may be configured to approach a target to deploy a warhead. The UAV 400 and gimbal system 412 include imaging, targeting, and fuzing elements that facilitate the gimballed warhead to remain boresighted with the munition point of aim, enabling unique target sets, points of aim, flight profiles, and attack angles. UAV 400 may be configured to use imagery and/or other sensor data to control operation of UAV 400 and/or the payload 114, such as controlling the gimbal system 112 to aim the payload 114 towards a particular target. In some cases, the imagery and/or sensor data may be used to approach a target location on an attack vector, hover adjacent to the target, or otherwise align the UAV 400 to interact with the target location.

In various embodiments, UAV 400 may include one or more of a logic device, an orientation sensor, a gyroscope/accelerometer, a global navigation satellite system (GNSS), a communication system, gimbal system, propulsion system, and other modules (e.g., as described with respect to FIGS. 1A-B). Operation of UAV 400 may be substantially autonomous and/or partially or completely controlled by a base station (e.g., as described with reference to FIGS. 1A-B).

In some embodiments, the gimballed system 412 and payload 414 (comprising a rotatable inner stage) comprise a warhead mount 420 for holding an explosive charge, a base mount 422 for holding the payload, a gimbal mechanism, and sensing, targeting, and fuzing elements. The sensing elements 416 (e.g., targeting sensors) may include cameras, laser rangefinders, infrared sensors, or any other suitable sensors for detecting the target. The targeting elements may include computer processors, algorithms, or any other suitable means for identifying the target and calculating the necessary adjustments to maintain the point of aim (e.g., as described with reference to FIGS. 1A-B). The targeting sensors 416 may be configured to capture sensor data (e.g., visible spectrum images, infrared images, narrow aperture radar data, laser spot tracker, and/or other sensor data) of a target. The sensing elements 416 may further include fuzing elements such as proximity sensors, contact sensors, or other suitable components for detonating the warhead.

In some embodiments, the gimbal system 412 comprises two orthogonal axes (or more axes in some embodiments) of rotation, which enable the warhead 420 to maintain the point of aim independently of the motion of the UAV. The first axis of rotation 418A may be parallel to the longitudinal axis of the warhead body 420, while the second axis of rotation 418B may be perpendicular to the first axis. In some embodiments, the gimbal system 412 comprises a single axis of rotation. The gimbal system 412 may be controlled by a computer processor that receives inputs from the imaging and targeting elements, calculates the necessary adjustments, and sends commands to the gimbal control system.

In operation, the sensing elements 416 detect the target, and the targeting elements calculate the necessary adjustments to maintain the point of aim. The computer processor then sends commands to the gimbal mechanism 412 to rotate the warhead body about the two orthogonal axes 418A-B to compensate for the motion of the carrying vehicle and maintain the point of aim. In embodiments with more than two axes, the computer processor sends commands to rotate the warhead body about the more than two axes. The fuzing elements detonate the warhead upon reaching the target or an area proximate to the target, resulting in improved targeting accuracy and reduced collateral damage.

Figure 4A:
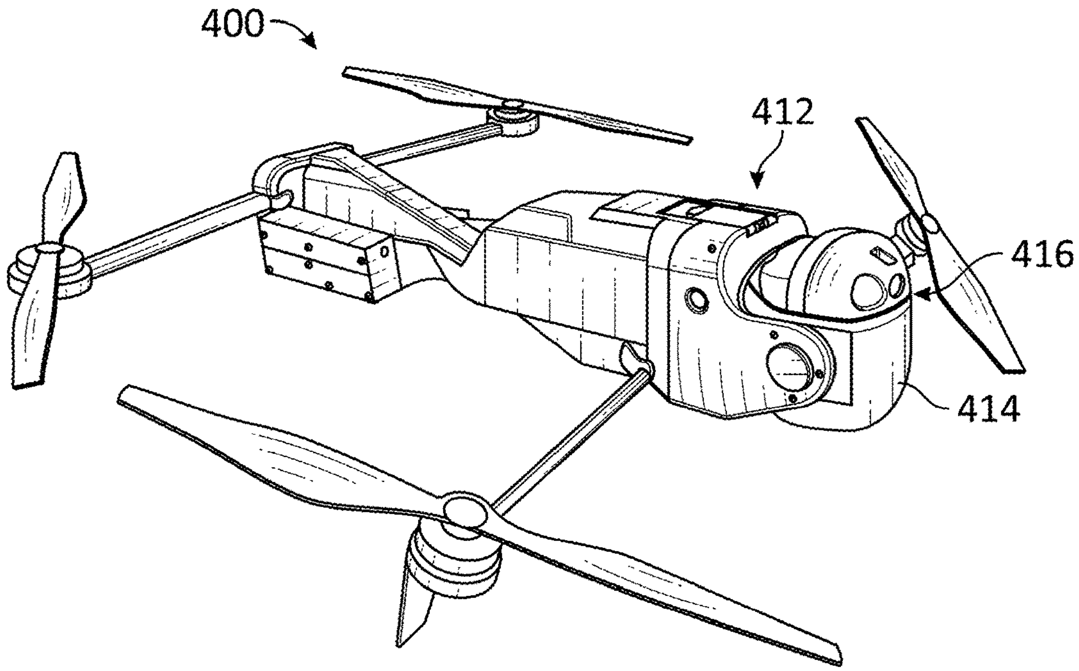
FIGS. 4A, 4B, 4C, 4D, 4E, 4F, and 4G are views of an example gimballed warhead payload for a UAV, in accordance with one or more embodiments of the present disclosure.
Figure 4B:
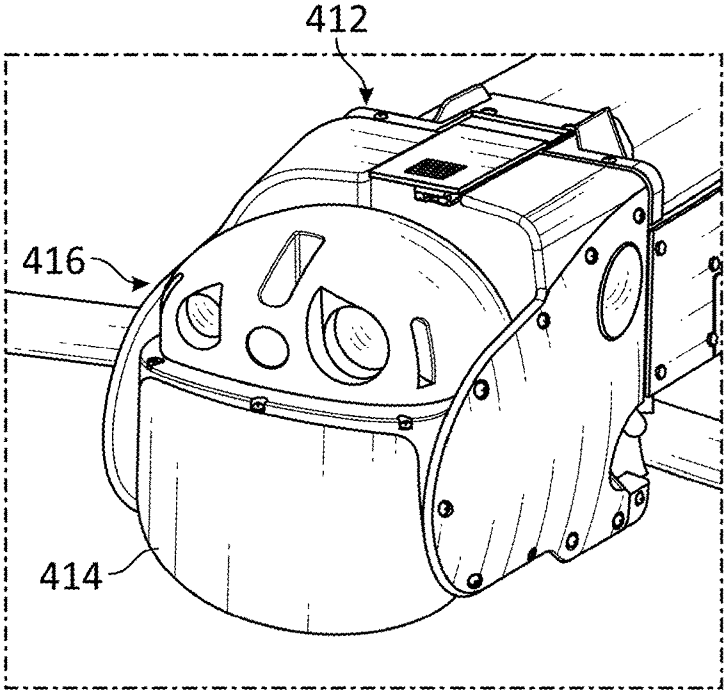
Figure 4C:
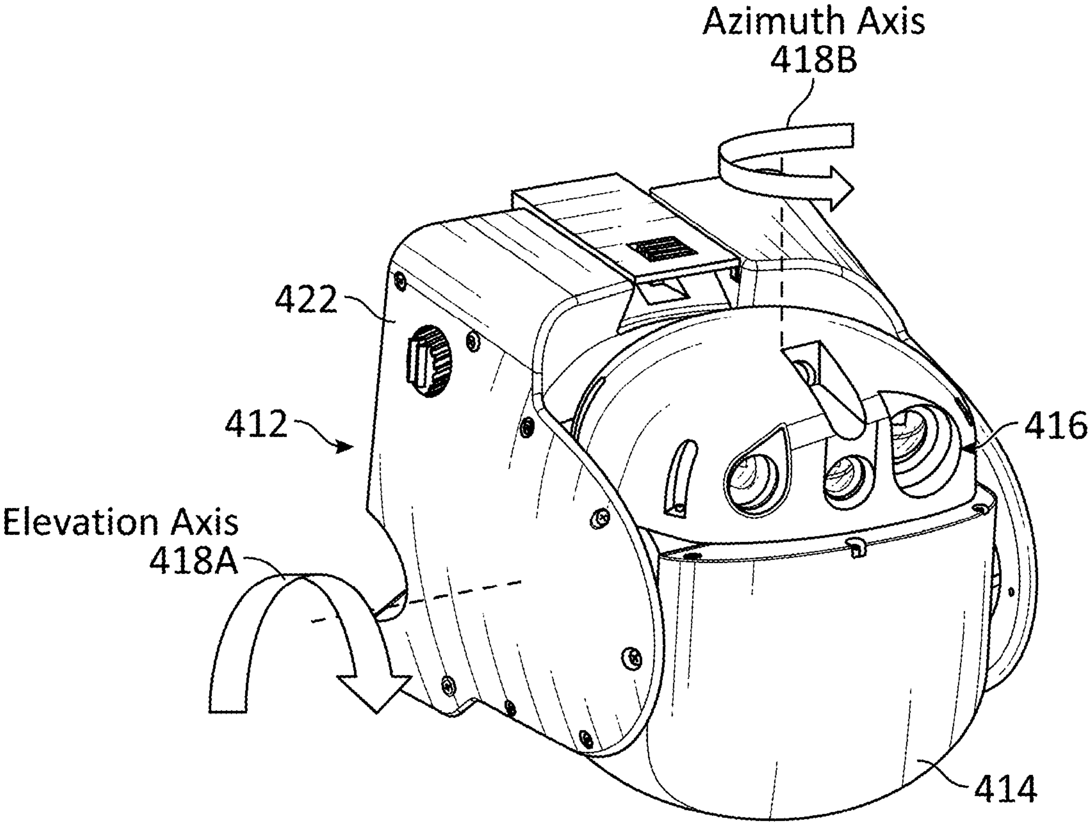
Figure 4D:
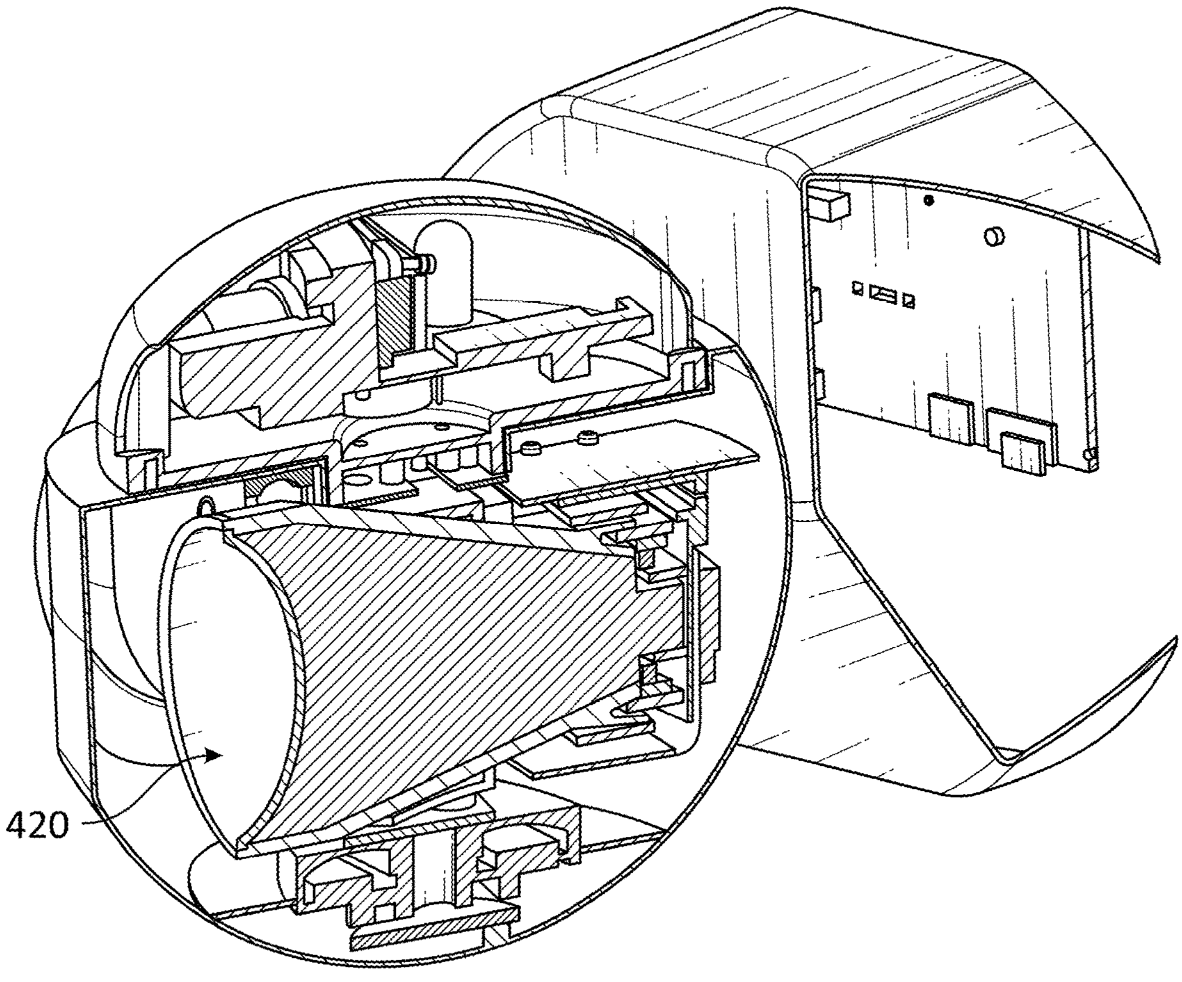
Figure 4G:
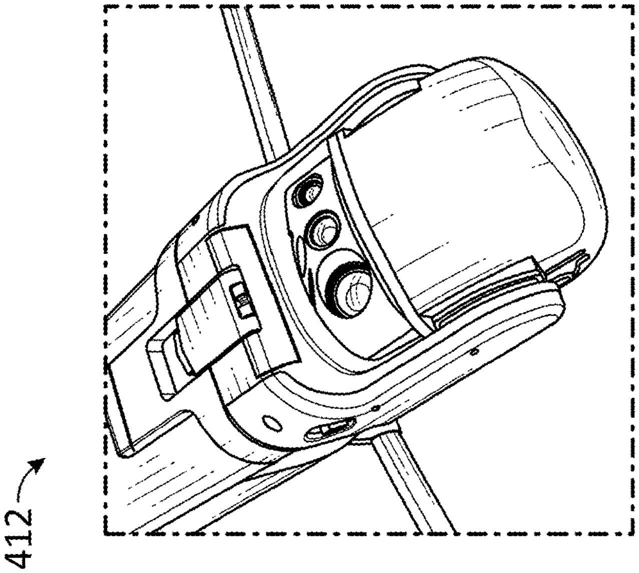
Figure 4F:
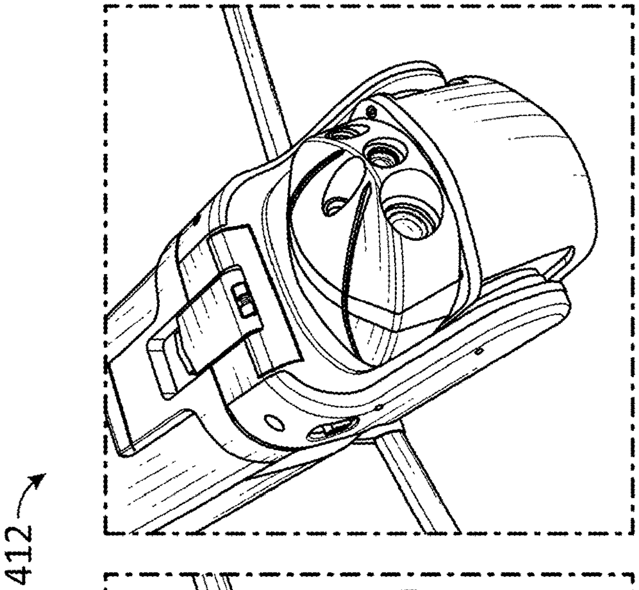
Figure 4E:
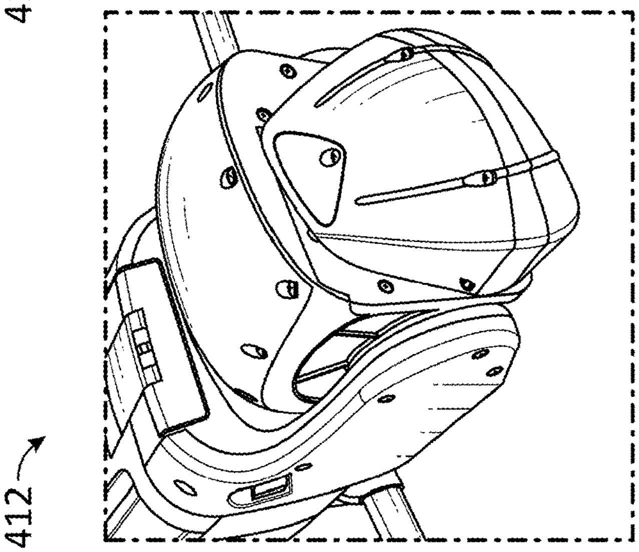

Referring to FIGS. 4E-G, example images of a 2-axis gimballed warhead mount will now be described, in accordance with one or more embodiments. The present disclosure includes a gimbaled munition payload that utilizes a 2-axis actively stabilized mount controlled by a custom inertial navigation system (INS) and gimbal controller for precision placement and balance. The mount contains an IMU, imaging sensors, encoders, and other feedback and control elements for gimbal position and stability. The system includes targeting sensors such as thermal imagers, LADAR, and electro-optical imagers. The warhead is located within a protective shell in the lower part of the inner stage and is attached to the same framework as the targeting sensors. This allows for mechanical boresighting and movement of the warhead with the sensors while being contained in a protective shell. The system's open architecture allows for various types of warheads to be mounted, including Precision EFP, concentrated fragmenting, and other shape charge warheads.

The gimbal function and warhead mounting system allow for the sensor/warhead mount to be pointed anywhere between straight up (FIG. 4G) and down (FIG. 4E) while also correcting for yaw errors, mis-alignments in heading, or target offsets. For example, the sensor/warhead mount can be rotated to the left (FIG. 4F) or right.

As will be appreciated by those skilled in the art, the gimballed warhead system disclosed herein provides a significant improvement over traditional warheads fixed into or on the vehicle airframe. The independent control and stabilization of the point of aim enable unique target sets, points of aim, flight profiles, and attack angles, resulting in improved targeting accuracy and reduced collateral damage. The system may be used in unmanned aerial vehicles (UAVs), missiles, and/or other aerial vehicles for achieving precision warhead targeting.

Figure 5:
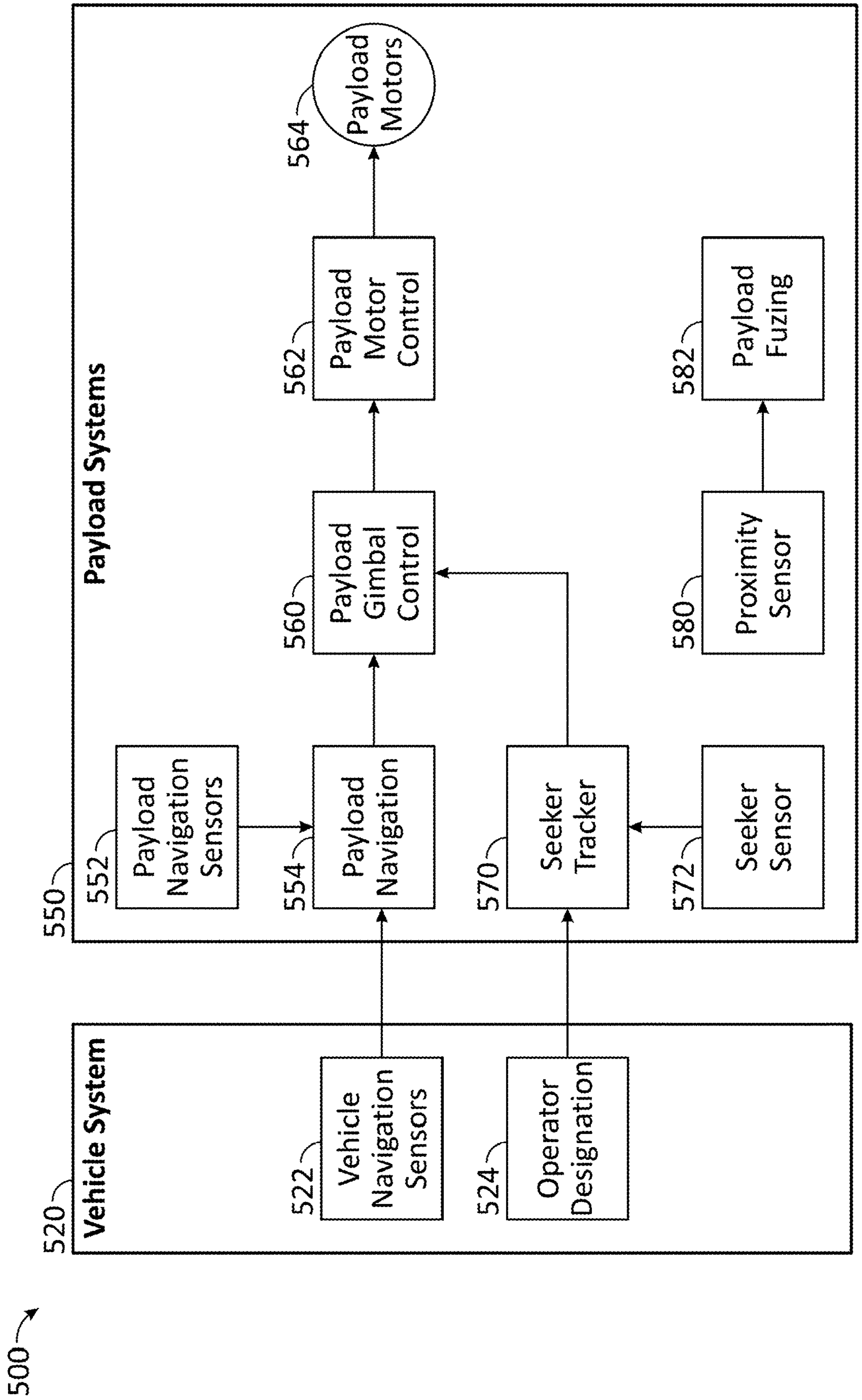
FIG. 5 illustrates example logic components for operation of an example gimballed warhead payload system, in accordance with one or more embodiments of the present disclosure.

Referring to FIG. 5, example logical components of gimballed warhead system will now be described, in accordance with one or more embodiments. The system 500 may be implemented as rapid employment, optionally-lethal vertical takeoff and landing (VTOL) UAV that equips small aerial vehicles with the ability to engage threats within and beyond the range and capabilities of existing organic weapon systems while minimizing collateral damage and maximizing standoff. The systems described herein can employ several different types of warheads that are integrated into a removable payload system. This payload system allows the system to point both the targeting sensors and warhead for effective and precision deployment on targets.

In some embodiments, the system 500 includes vehicle systems 520 and payload systems 550, which may be implemented using one or more of the components described in FIGS. 1A-B. The vehicle systems 520 includes vehicle navigation sensors 522 and operator designation components 524. The vehicle navigation sensors 522 may include orientation sensors (e.g., orientation sensors 128), gyroscope/accelerometers (e.g., gyroscope/accelerometer 132), a GNSS (e.g., GNSS 134), imaging sensors, or other sensors used for UAV navigation. The operator designation components 524 include logic for designating one or more desired targets, which may include user interface components allowing the operator to define a target (e.g., classification, location), confirm a target, and enable deployment of the warhead.

The payload systems 550 includes systems for controlling the gimble system, tracking a target, and deploying the warhead. In some embodiments, the payload systems 550 include payload navigation sensors 552 which may include orientation sensors (e.g., orientation sensors 128), gyroscope/accelerometers (e.g., gyroscope/accelerometer 132), a GNSS (e.g., GNSS 134), imaging sensors, gimbal positioning sensors, and/or other sensors. In some embodiments, one or more of the payload sensors 552 may also be used for vehicle navigation. The payload navigation system 554 is configured to orient the payload towards a tracked target at an angle to facilitate effective deployment of the warhead.

The payload systems 550 further include one or more seeker sensors 572 (e.g., an imaging sensor or other sensor) and a seeker tracker 570 configured to image a scene and detect and track one or more targets as defined by the operator (operator designation 524). A tracked target location is provided, along with payload navigation information (from payload navigation system 554), to payload gimbal control 560, which determines a gimbal orientation for the tracked target. The gimbal orientation may be determined from vehicle and payload navigation information which may include a flight vector, flight path to target, and other navigation information, the target classification, vulnerable locations on the target for warhead deployment, a desired angle for effective warhead deployment, and a proximity to the target for deployment. The desired gimbal orientation is provided to a payload motor control 562 (e.g., as desired gimbal motor torques), which controls the payload motors 564 to rotate the payload along the two axes to the appropriate angle for deployment. In some embodiments, the payload orientation is continuously adjusted to maintain a proper attack angle of the payload on approach.

The payload systems 550 further include proximity sensors 580 that detect a deployment range for the warhead. In some embodiments, the proximity sensors 580 detect a distance to the target, and deploy the warhead when the determined proximity is within a threshold range. The proximity sensors 580 are configured to provide a signal to payload fuzing components 582 to deploy the warhead at the target. In some embodiments, an effective deployment includes deploying a warhead a short distance away from the target. In some embodiments, the proximity sensors may include a touch or pressure sensor on the payload that require the UAV to fly into contact with the target to deploy the warhead.

In various embodiments, the targeting sensors can be any type of sensor suitable for detecting a target, such as radar, laser spot tracker, infrared, and/or visual sensors. The flight control system and targeting system can be any type of system suitable for guiding the warhead to the target, such as a GPS, visual, or other inertial guidance system. The targeting sensors can be mounted on the UAV or on a separate platform that communicates with the UAV. The targeting sensors can include a radar system, an infrared system, a visual system, or any combination thereof. The targeting sensors are used to detect a target, which can be a stationary or moving object.

At a high level, the gimballed munition payload utilizes a 2-axis inertially and actively stabilized mount actuated by direct drive electrical motors and controlled by a custom inertial navigation system and gimbal controller. The mount contains an inertial measurement unit, imagining sensors, encoders, and other elements for feedback and control of the gimbal position and stability. The mounting of the munition allows for precision placement and balance to maximize gimbal stability and allow for precise boresight to the targeting sensors. Modeling a targeted sensor with a tracking boresight allows the system to aim a sensor at one or more targets, such as vehicles, facilities, or other targets. The target is identified when a given target is in view, as determined by the sensor's constraints and the targeted object's constraints. Additional housing and shrouds are provided for structure and ingress protection.

The system includes targeting sensors, including (i) thermal imagers, (2) LADAR (Laser Detection And Ranging) systems use light to determine the distance to an object. Since the speed of light is well known, LADAR can use a short-pulsed laser to illuminate a target and then time how long it takes the light to return, and (3) electro-optical imager.

Figure 6:
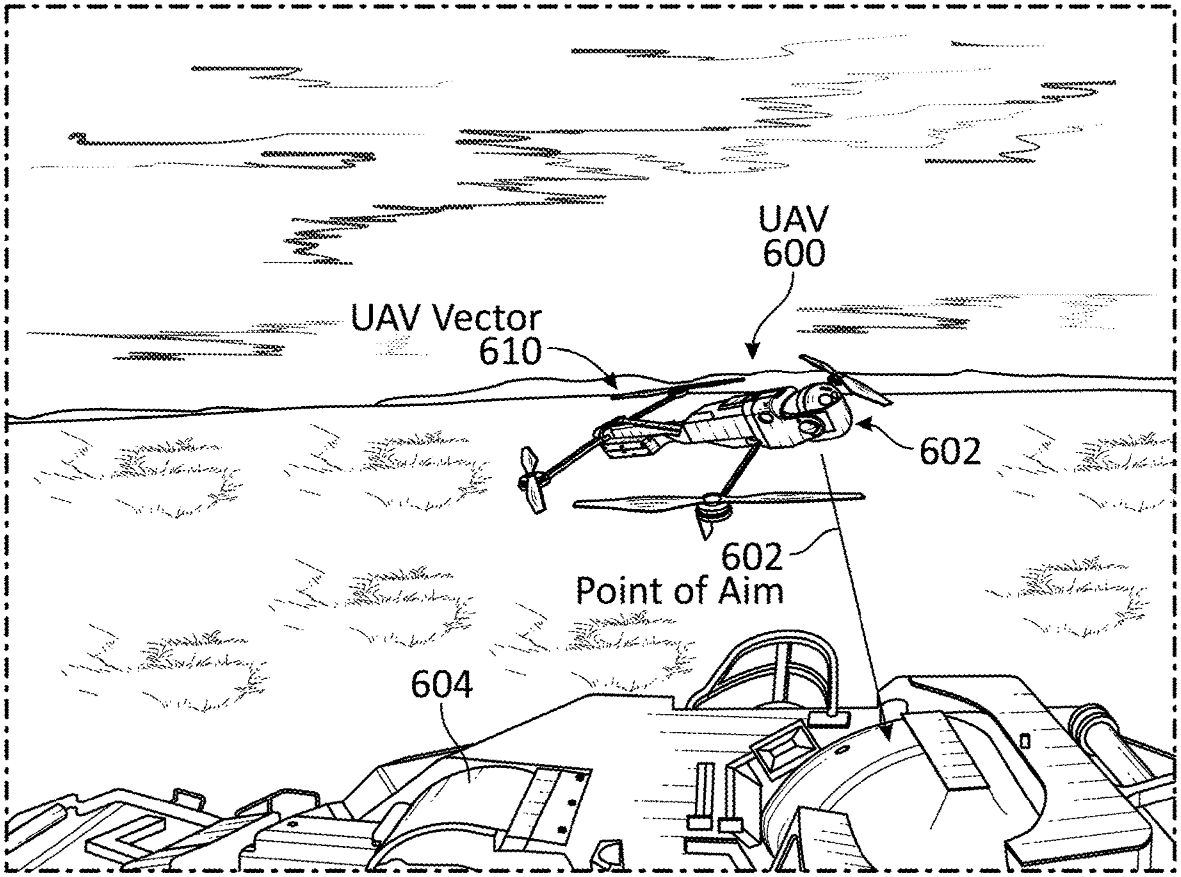
FIG. 6 illustrates an off-axis attack engagement of a target, in accordance with one or more embodiments of the present disclosure.

Referring to FIG. 6, an example off-axis attack engagement will now be described, in accordance with one or more embodiments. As previously discussed, to successfully deploy a warhead on a target, it is desirable for the warhead to engage the target at a desired location and angle. Mounting the warhead on an independently moving gimbal system decouples the warhead pointing from the vehicles approach angles. This solves many of the problems described above and additionally allows for more broad and dynamic delivery vehicle flight profiles. It further decouples the delivery vehicles required closure rates as those are typically tied closely to vehicle approach angles due to aerodynamics. Slower moving delivery vehicles (such as a VTOL drone) can take advantage of hovering near or moving alongside targets allowing more precision or fidelity in where the warhead will be employed. The same equipped drone can employ a top-down, side, or even bottom-up attack across a broad range of closure rates without reconfiguration.

As illustrated, a UAV system 600 (e.g., UAV systems described with reference to FIGS. 1A-5) includes a gimballed warhead payload 602 as described herein. As illustrated, the UAV 600 has a flight vector 610 which is not directed towards the identified target 604. The flight vector 610 may be off-axis due to aerodynamics, wind, movement of the target 604, or other factors. In operation, the gimballed warhead payload 602, tracks the target 604 and orients the warhead to aim at the target 604 (e.g., point of aim 620). In this manner, the warhead 602 can be deployed when in proximity to the target 604, even when the UAV vector 610 is off axis.

Figure 7A:
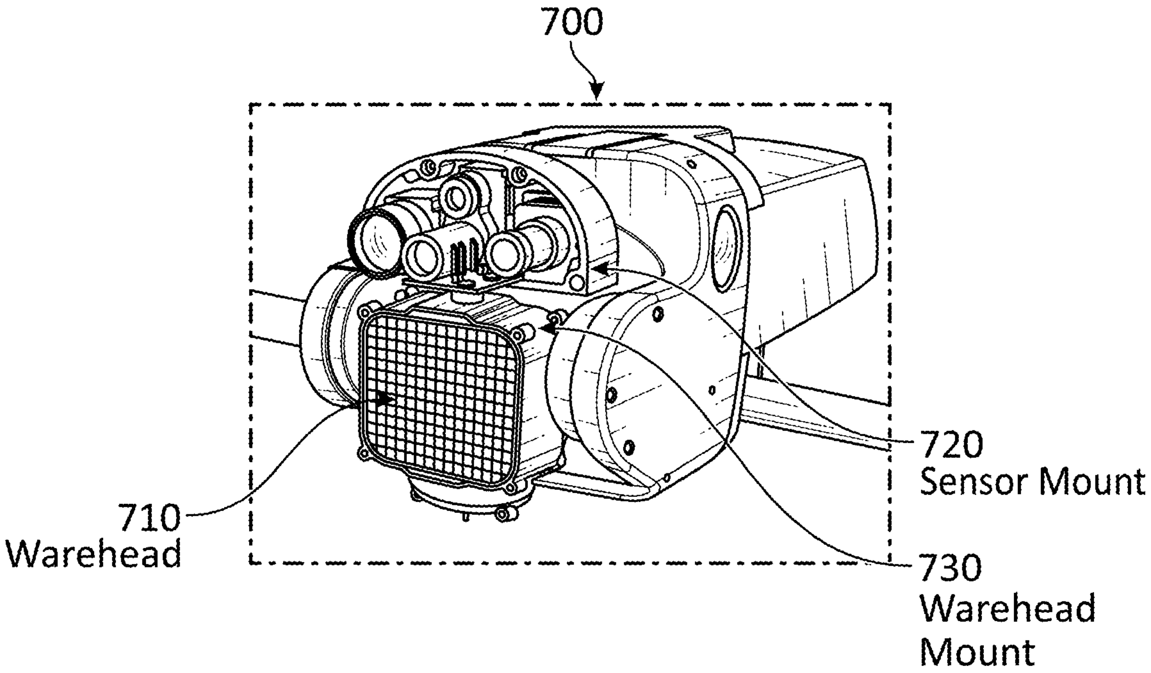
FIGS. 7A and 7B illustrate example views of a gimballed warhead and targeting sensors, in accordance with one or more embodiments of the present disclosure.
Figure 7B:
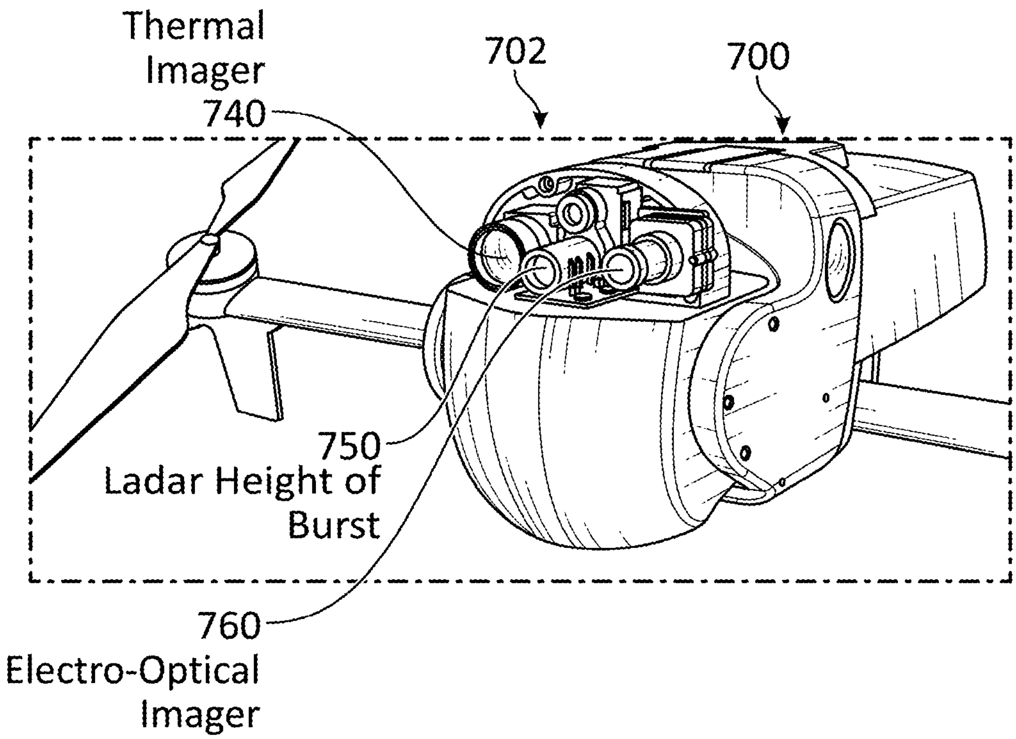

Referring to FIGS. 7A and 7B, example components of a gimballed warhead system will now be described, in accordance with one or more embodiments. A gimballed warhead system 700 includes a warhead mounted gimbal as disclosed herein. The gimballed warhead system 700 includes a warhead mount 730 configured to hold the warhead 710 in the gimballed warhead system 700 for deployment on a target. In some embodiments, the gimballed warhead system 700 employs a directional fragmenting warhead, which creates a pattern of fragments similar to a shotgun blast that has a set divergence angle. Without a gimbaled munition, this divergence angle would be designed to be much larger to spread out the fragments further to overcome pointing limitations of the airframe itself and a lower fragment density would result reducing the lethality and usefulness. In some embodiments, the gimballed warhead system 700 may employ an explosively formed projectile (or similar munitions) that has an extremely narrow divergence. The gimballed warhead system 700 facilitates precision targeting allowing this warhead to be deployed effectively.

The warhead itself is located within a protective shell in the lower part of the inner stage. This protects the warhead and fuzing components from external elements. The warhead is attached to the same framework as the targeting sensors, which allows the warhead to be mechanically boresighted and move with the sensors while still being contained in a protective shell. In various embodiments, an open architecture design is used to allow for various types of warheads to be mounted. Precision EFP, concentrated fragmenting, and other shape charge warheads are particularly suited to take advantage of the targeting and pointing abilities of this system.

In the illustrated embodiment, targeting sensors 702 include thermal imagers 740, LADAR 750 (height of burst sensor), and electro-optical imagers 760, which provide accurate targeting information for the munition payload. The thermal imagers 740 detect the heat signatures of targets, while the electro-optical imagers 760 use visible light to capture high-resolution images of the target. LADAR 750 uses light to determine the distance to an object to determine a desired point of detonation in relation to the target (e.g., a warhead designed to explode at a specific distance/height from the target).

In operation, the LADAR 750 and/or other sensors (e.g., imaging, radar, laser, infrared sensors, of the like) operate as proximity sensors (e.g., proximity sensor 580 of FIG. 5) and continuously scan and track the target to determine its position and distance. After the warhead reaches a predetermine distance from the target, the sensor sends a signal to initiate the detonation sequence (e.g., payload fuzing 582 of FIG. 5). By detonating the warhead at a specific distance from the target, LADAR 750 sensor is designed to optimize the destructive effects of the warhead through a controlled explosion that maximizes the blast and fragmentation effects, increasing the chances of neutralizing or damaging the target.

As will be appreciated by those skilled in the art, the present disclosure provides systems and methods for mounting a warhead on an independently moving gimbal system, which decouples the warhead pointing from the delivery vehicle approach angles. The present disclosure solves many of the problems associated with traditional delivery vehicle flight profiles, and allows for more broad and dynamic flight profiles, as well as more precise targeting of smaller, loitering munitions. The present disclosure provides a solution for delivering smaller warheads with greater precision, decreasing the SWaP-C (i.e., size, weight, power and cost) and collateral damage of the system, while maintaining desired effects on the target.

The system is particularly useful for smaller, loitering munitions that require a smaller warhead and more precise targeting to maximize the effects. The invention allows for slower moving delivery vehicles, such as VTOL drones, to hover near or move alongside targets, providing more precision in where the warhead will be employed. The same equipped drone can employ a top-down, side, or even bottom-up attack across a broad range of closure rates without reconfiguration.

Figure 8A:
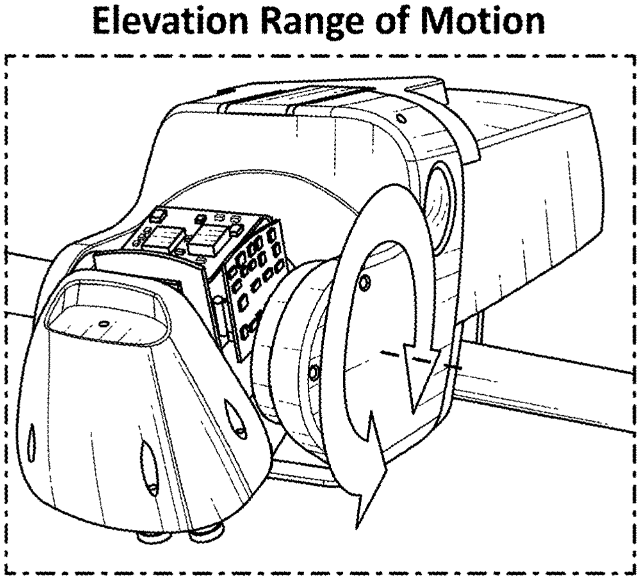
FIGS. 8A, 8B, 8C, 8D, 8E, and 8F, illustrate example views of a gimballed warhead rotated at various elevation and azimuth angles, in accordance with one or more embodiments of the present disclosure.
Figure 8B:
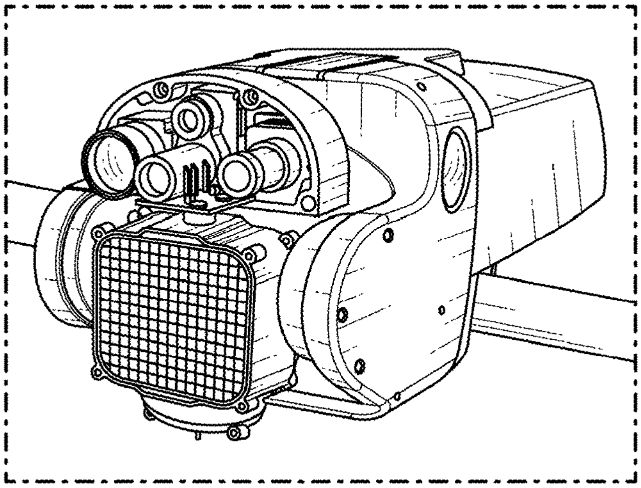
Figure 8C:
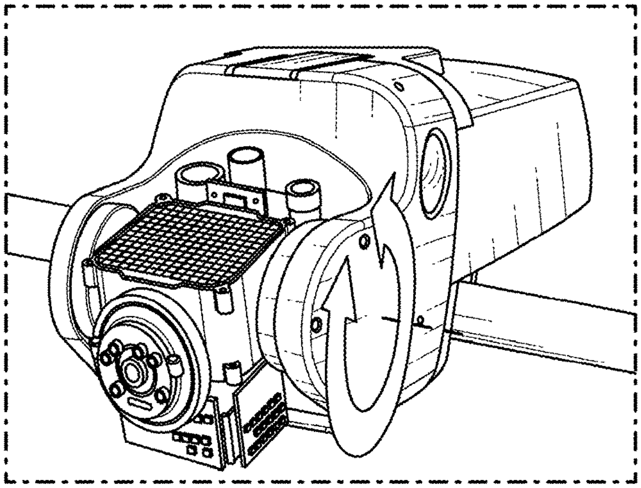
Figure 8D:
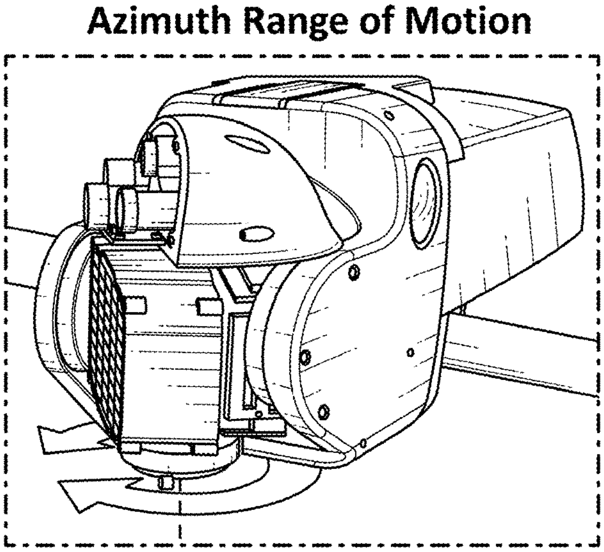
Figure 8E:
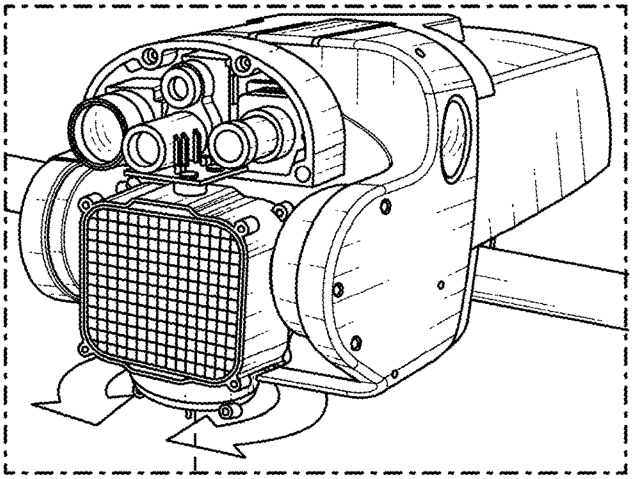
Figure 8F:
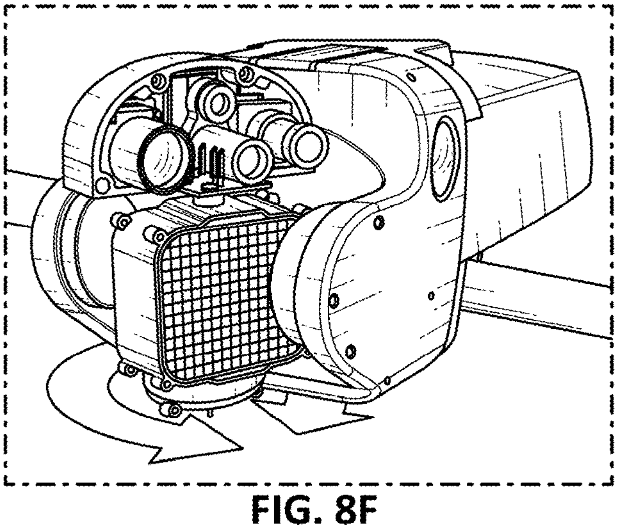

Referring to FIGS. 8A-8F, examples of a 2-axis range of motion of the gimballed warhead that allows a warhead's point of aim to be controlled and stabilized independently from the motion of the carrying vehicle (e.g., UAV, missile, etc.) are illustrated, in accordance with one or more embodiments. The elevation range of motion is illustrated in FIG. 8A (facing down), 8B (facing forward), and 8C (facing up). The azimuth range of motion is illustrated in FIG. 8D (facing right), 8E (facing forward), and 8F (facing left).

Figure 9:
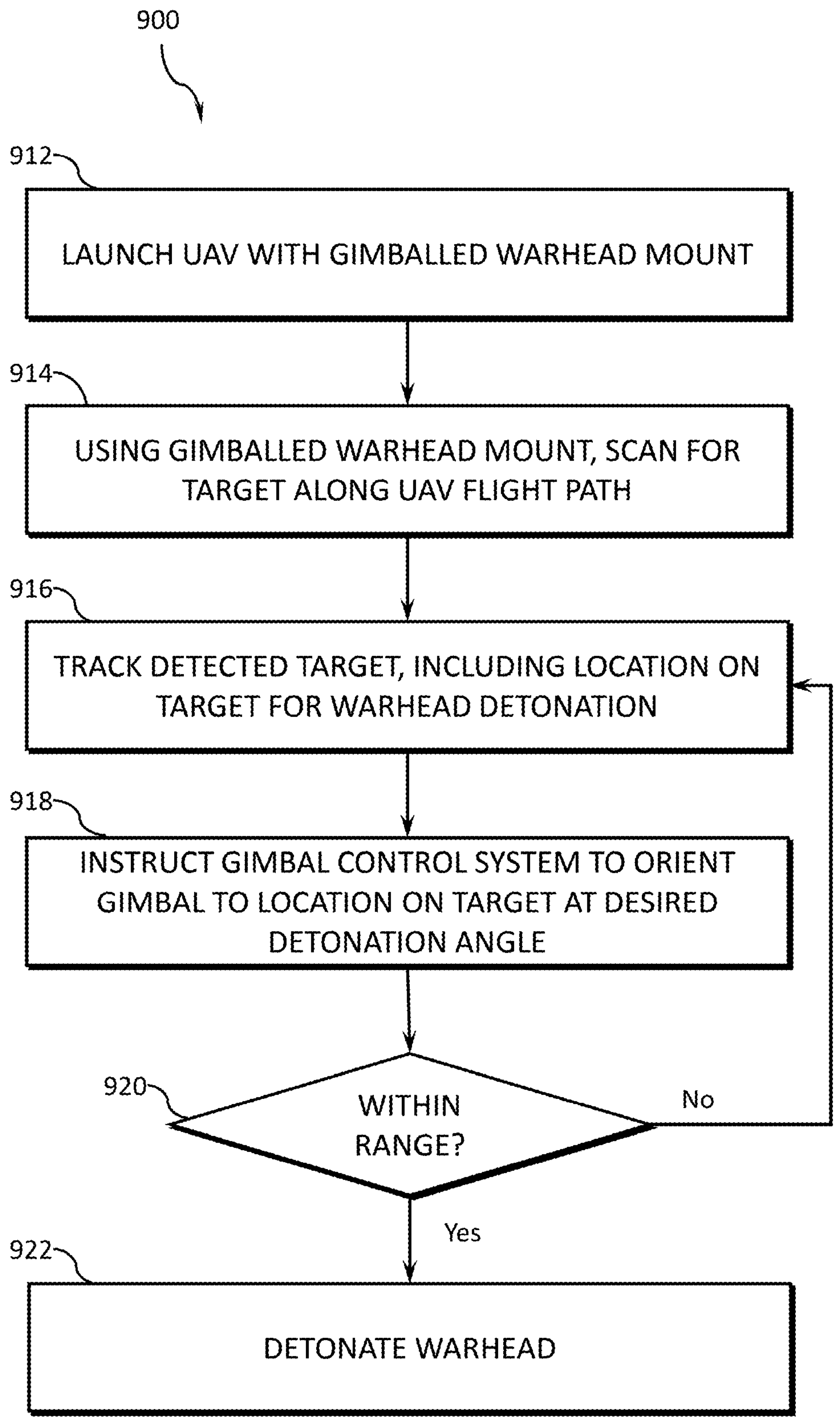
FIG. 9 illustrates an example process for operating a UAV with a gimballed warhead system, in accordance with one or more embodiments of the present disclosure.

Referring to FIG. 9, a process for operating a UAV with a gimballed warhead mount will now be described, in accordance with one or more embodiments. The process 900 may be performed by one or more of the gimballed warhead systems described herein in FIGS. 1A-8F.

At block 912, the UAV with gimballed warhead mount is launched on a mission to locate and deploy a warhead against a target, such as a military tank. The UAV is configured with advanced targeting systems, precise gimballed guidance mechanisms, and a warhead designed for maximum effectiveness against the target.

In block 914, the gimballed warhead mount is used to scan for the target along the UAV flight path. In various embodiments, this may be performed using the targeting sensors of the gimballed systems, which may include visual imaging sensors, infrared sensors, radar tracking, or other sensor systems.

In block 916, after the target it detected, the target is tracked including a location on the target for warhead detonation. As the UAV flight path maneuvers closer to the target, the UAV system calculates the attack vector and warhead angle required for desired effectiveness. The attack vector refers to the direction from which the UAV approaches the target. In various embodiments, the flight path and/or attack vector may be selected to minimize the target's defensive capabilities while maximizing the chances of hitting vulnerable areas.

In block 918, a logic device instructs the gimbal control system to orient the gimbal towards the identified location on the target and at the desired detonation angle. In some embodiments, the gimballed orientation is calculated as an offset to the calculated attack vector. The UAV's guidance system calculates the optimal angle based on real-time data and adjusts its trajectory accordingly.

The process 900 continues to track the target, calculate the attacked vector, and warhead detonation angle until the warhead is in range of the target. In block 920, if the proximity sensor determines that the warhead is within range, an instruction is sent to detonate the warhead in block 922.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the present disclosure. It should also be understood that numerous modifications and variations are possible in accordance with the principles of the present disclosure. Accordingly, the scope of the invention is defined only by the following claims.

What is claimed is:

1. A system comprising:

an unmanned aerial vehicle (UAV) comprising a body and a plurality of propulsion systems;

a gimbal system comprising:

a plurality of targeting sensors on a sensor mount; and a warhead mount configured to carry and deploy a warhead, wherein the gimbal system is configured to move the sensor mount and the warhead mount together; and a logic device configured to:

detect a target along a UAV flight path;

track the target using sensed data from the targeting sensors;

calculate an attack vector for the UAV to intercept the target, the attack vector defining a direction from which the UAV is to approach the target;

calculate a point of aim for the warhead, wherein the point of aim is independent of the attack vector; and instruct the gimbal system to orient the warhead and the sensor mount according to the calculated point of aim.

2. The system of claim 1, wherein the gimbal system is mounted on a front side of the UAV when the UAV is aligned with the attack vector.

3. The system of claim 1, wherein the targeting sensors include an optical imaging sensor, thermal imaging sensor, and/or laser seeker.

4. The system of claim 1, wherein the targeting sensors include a proximity sensor configured to determine a proximity to the target.

5. The system of claim 4, wherein the gimballed system further comprises fuzing elements configured to detonate the warhead after the proximity sensor determines that the warhead is within a desired detonation range.

6. The system of claim 1, wherein the gimballed system comprises a rotatable framework comprising the warhead mount and the sensor mount.

7. The system of claim 1, wherein the gimbal system comprises one or more motors configured to selectively rotate the sensor mount and the warhead mount along a first axis of rotation perpendicular to the warhead mount and a second axis of rotation perpendicular to the first axis of rotation.

8. The system of claim 1, wherein the warhead is continuously oriented at the point of aim towards the target independent of the flight path.

9. The system of claim 1, wherein the gimbal system further comprises a payload navigation system configured to process sensor data from at least one payload navigation sensor and at least one UAV navigation sensor and to calculate the point of aim based on the sensor data.

10. The system of claim 1, wherein the targeting sensors and the warhead mount are actuated by direct drive electrical motors and controlled by an inertial navigation system and gimbal controller.

11. A method comprising:

detecting a target along an unmanned aerial vehicle (UAV) flight path, the UAV comprising a body, a plurality of propulsion systems, and a gimbal system comprising a plurality of targeting sensors on a sensor mount and a warhead mount configured to carry and deploy a warhead, wherein the gimbal system is configured to move the sensor mount and the warhead mount together;

tracking the target using sensed data from at least one of the targeting sensors;

calculating an attack vector for the UAV to intercept the target, the attack vector defining a direction from which the UAV is to approach the target;

calculating a point of aim for the warhead, wherein the point of aim is independent of the attack vector; and instructing the gimbal system to orient the warhead and the sensor mount according to the point of aim.

12. The method of claim 11, wherein the gimbal system is mounted on a front side of the UAV when the UAV is aligned with the attack vector.

13. The method of claim 11, wherein the targeting sensors include an optical imaging sensor, thermal imaging sensor, and/or laser seeker.

14. The method of claim 11, wherein the targeting sensors include a proximity sensor, and wherein the method further comprises determining a proximity to the target.

15. The method of claim 14, wherein the gimballed system further comprises fuzing elements configured to detonate the warhead after the proximity sensor determines that the warhead is within a desired detonation range.

16. The method of claim 11, wherein the gimballed system comprises a rotatable framework comprising the warhead mount and a sensor mount.

17. The method of claim 11, wherein the gimbal system comprises one or more motors; and wherein the method further comprises selectively rotating the sensor mount and the warhead mount along a first axis of rotation perpendicular to the warhead mount and a second axis of rotation perpendicular to the first axis of rotation.

18. The method of claim 11, further comprising continuously orienting the point of aim towards the target independent of the flight path.

19. The method of claim 11, wherein the gimbal system further comprises a payload navigation system; and wherein the method further comprises processing sensor data from at least one payload navigation sensor and at least one UAV navigation sensor and calculating the point of aim based on the sensor data.

20. The method of claim 11, wherein the targeting sensors and the warhead mount are actuated by direct drive electrical motors and controlled by an inertial navigation system and gimbal controller.

* * * * *